United States Patent
Miller et al.

(10) Patent No.: US 8,380,338 B2
(45) Date of Patent: Feb. 19, 2013

(54) METHOD AND APPARATUS FOR STRIPPING HOLES IN A METAL SUBSTRATE

(75) Inventors: Mitchell O. Miller, Kings Mountain, NC (US); Clyde W. Caskey, Gastonia, NC (US)

(73) Assignee: Huffman Corporation, Clover, SC (US)

( * ) Notice: Subject to any disclaimer, the term of this patent is extended or adjusted under 35 U.S.C. 154(b) by 537 days.

(21) Appl. No.: 12/386,690

(22) Filed: Apr. 22, 2009

(65) Prior Publication Data

US 2009/0270014 A1 Oct. 29, 2009

Related U.S. Application Data

(60) Provisional application No. 61/125,847, filed on Apr. 29, 2008.

(51) Int. Cl.
*G06F 19/00* (2011.01)
(52) U.S. Cl. .............................. 700/164; 700/195; 83/22
(58) Field of Classification Search .................. 700/164, 700/182, 195
See application file for complete search history.

(56) References Cited

U.S. PATENT DOCUMENTS

| | | | |
|---|---|---|---|
| 4,998,005 A | 3/1991 | Rathi et al. | 219/121.83 |
| 6,004,620 A * | 12/1999 | Camm | 427/142 |
| 6,380,512 B1 * | 4/2002 | Emer | 219/121.71 |
| 6,723,951 B1 | 4/2004 | McGraw | |
| 6,905,396 B1 | 6/2005 | Miller et al. | 451/38 |
| 7,473,160 B1 | 1/2009 | Gerstner | 451/7 |
| 7,544,112 B1 | 6/2009 | Miller et al. | 451/2 |
| 2002/0076326 A1 | 6/2002 | Zabala et al. | |
| 2009/0213216 A1 * | 8/2009 | Hastilow | 348/142 |

FOREIGN PATENT DOCUMENTS

| | | |
|---|---|---|
| EP | 1291142 A2 | 8/2002 |
| EP | 1510283 A1 | 3/2005 |
| EP | 1557240 A1 | 7/2005 |
| EP | 1739410 A1 | 1/2007 |
| EP | 1859896 A1 | 11/2007 |

* cited by examiner

*Primary Examiner* — Ryan Jarrett
(74) *Attorney, Agent, or Firm* — K&L Gates LLP

(57) ABSTRACT

A method and apparatus for stripping foreign matter from holes in a substrate, such as a turbine component, which includes using a scanner to locate the hole and operating a water jet apparatus to direct a water jet or an abrasive water jet into the hole for stripping. A CAD model of the original turbine component may be used in the control system of the water jet apparatus to initially locate the scanner at the general or theoretical location of the hole. A reverse flow of low pressure water may be provided to further clear foreign matter from the hole.

25 Claims, 5 Drawing Sheets

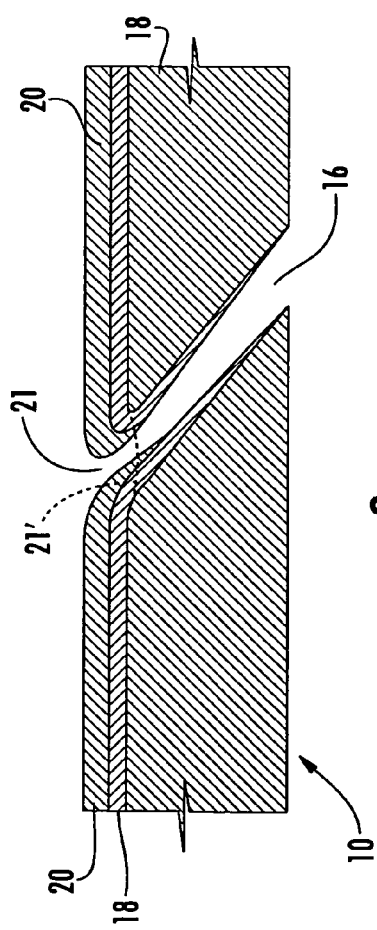
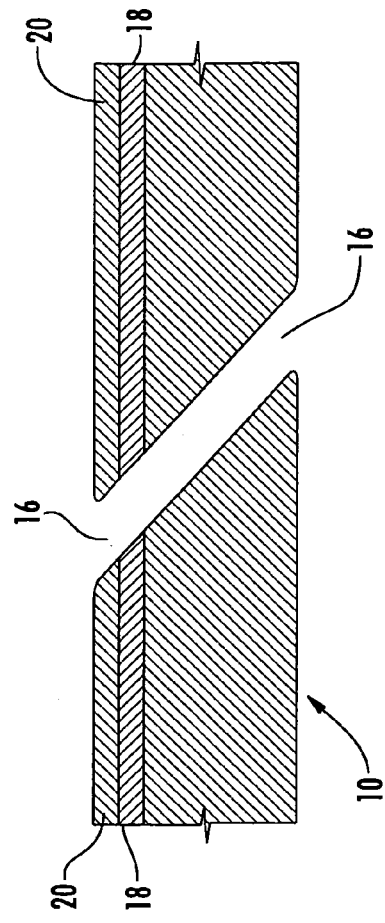

METHOD AND APPARATUS FOR STRIPPING HOLES IN A METAL SUBSTRATE

CROSS-REFERENCE TO RELATED APPLICATIONS

This application is entitled to the benefit of, and claims priority to, provisional U.S. Patent Application Ser. No. 61/125,847, filed Apr. 29, 2008, and entitled "METHOD AND APPARATUS FOR STRIPPING HOLES IN METAL," the entirety of which is incorporated herein by reference.

BACKGROUND OF THE INVENTION

The present invention relates generally to a method and apparatus for stripping holes of foreign matter to clear the holes, and more particularly to a method and apparatus for stripping holes in a metal substrate having a coating or other foreign matter applied thereto.

One such metal substrate is turbine components. Because turbine components are subjected during normal use to extremely high temperatures as well as significant temperature variations, such components become somewhat distorted, twisted or leans during use, and the normal protective coatings applied to such components become worn. As a result, these components are often repaired by a process that includes first removing the old worn coatings and applying new coatings to the surfaces of the repaired component.

There are known applications in which a metal substrate, such as a turbine component, is formed with a plurality of holes or openings passing through a surface of the component, and these openings must sometimes be cleared or stripped of foreign matter that is lodged in the holes. This removal process is substantially more difficult in situations where the metal substrate also has a coating over an exposed surface of the substrate, and the holes are covered in whole or in part by the coating.

By way of example, it is well known that in gas turbine components holes are formed in the component to extend through an exterior wall of the turbine component to permit a cooling gas to be discharged through the holes from an interior cavity in the component that is in fluid communication with the hole and thereby form a thermal barrier film that protects the turbine component from the high temperature and temperature variations to which the turbine component is exposed during use.

As used herein, the term "turbine components" is intended to include individual turbine blades, blades mounted on a disk, blades that are machined integral to a rotor, air foils, vanes or buckets, shrouds, seals or duct segments, liners and transition pieces.

In most turbine components, one or more layers of coatings are applied to the surfaces of the component during the aforesaid repair process to replace the original coatings after they are removed during the repair process and to protect the underlying base metal from heat, abrasion, and other elements encountered by the component in its normal usage. For example, turbine blades may be formed of a base metal, a bond coating that is often diffusion bonded metallurgically to the base metal, and an outer thermal barrier coating (TBC) that is applied to the bond coat. After a period of usage of the turbine component, these coatings become worn and the component requires must be repaired as discussed above, and this repair process includes removal of the old worn coatings and applying new coatings applied over the surface of the component. It will apparent, however, that if these coatings are applied over the surface of a turbine component that is formed with the holes as described above, the coating or coatings either partially fill or completely fill the holes which will significantly obstruct the flow of cooling gas through the holes and thereby render the holes less effective or useless for their intended purpose unless the holes are stripped or cleared of most if not all of the coating material within the holes.

One known method of dealing with this problem in turbine components is to fill the holes with a plastic like material (e.g. Plastisol) before the coating is applied, and then cure this material using ultra-violet rays. In some cases, enough plastic like material is present so that it extends slightly above the exterior surface of the component so as to cause a bump or protrusion which can be used to locate holes for manual stripping. If the step of adding plastic material results in excess material being left on the exterior surface of the turbine component, which is often the case, such excess must be manually removed. After the holes have been plugged in this manner, a bond coating is applied over the plugged holes and the exterior surface of the component, and then the plastic material in the holes is removed using conventional equipment, and a small hand tool, such as a Dremel device, is manually used to open the holes by clearing any coating material that is lodged in the holes. Next a TBC is applied over the bond coating and, again, the holes are manually cleared using a tool such as a Dremel device. When it is recognized that many turbine components have a very large number of holes that must be manually stripped using this known method, it will be apparent that the process of manually stripping all of such holes is very time consuming and labor intensive. For example, one typical turbine blade will have as many as dozens or hundreds of holes, and a turbine liner may have tens of thousands of holes, whereby it may take an hour or more to manually strip all of these holes in the turbine blade, and hundreds of hours to manually strip the holes in the liner.

Therefore, a need exists for a method and apparatus that is capable of stripping holes from a metal substrate using a machine and a method that avoids the manual, labor intensive process that is presently being used.

BRIEF DESCRIPTION OF THE DRAWINGS

FIG. 2 is a diagrammatic drawing showing a base material having holes which are partially filled with coatings applied to the base metal; and FIG. 3 is a diagrammatic drawing similar to FIG. 2 but showing the holes after they have been stripped in accordance with the present invention.

SUMMARY OF THE INVENTION

Figure 1:
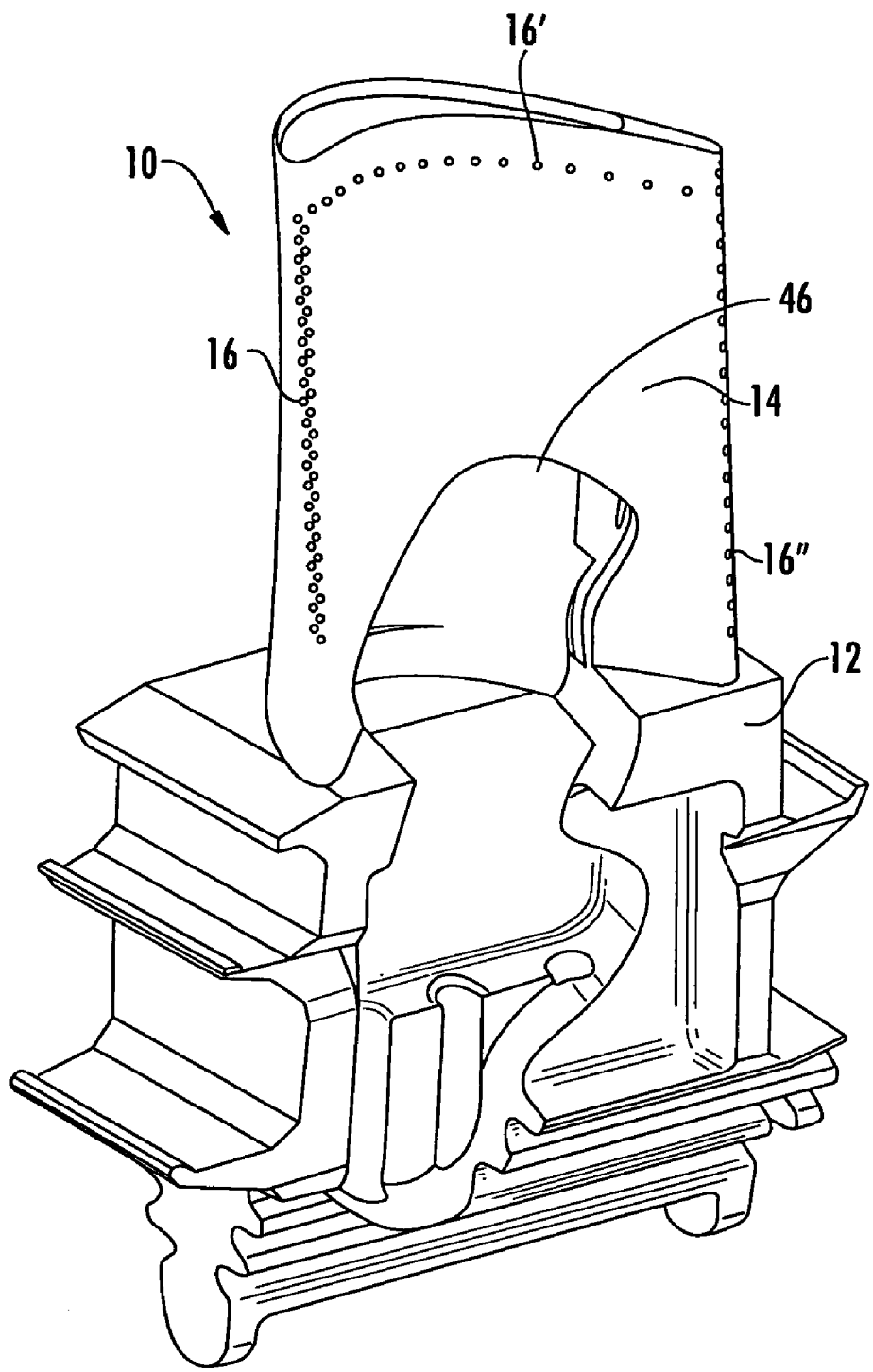
FIG. 1 is a drawing of a typical turbine component formed with a plurality of holes that can be stripped utilizing the present invention.

Briefly summarized, the present invention provides an apparatus for stripping foreign matter from at least one hole in the surface of a metal substrate which includes a frame; a mounting system for mounting the metal substrate in the frame; and a nozzle assembly mounted in the frame for movement relative to the metal substrate, the nozzle assembly including a delivery nozzle for directing a jet of high pressure water therefrom. A scanner is mounted on the frame for movement relative to the metal substrate, the scanner being capable of sensing a hole in the surface of the metal substrate and creating and transmitting digitized signals representing the location of the sensed hole on the surface of the metal substrate, and motion control motors are provided for moving the nozzle assembly and the scanner relative to the metal substrate. The apparatus includes a computerize control system which (i) controls the motion control motors to move the scanner across the surface of the metal substrate until the scanner senses the location of a hole in the surface of the metal substrate and generates the digitized signals representing the location of the hole; (ii) receives the digitized signals from the scanner and using such signals to control the motion control motors to move the nozzle assembly relative to the metal substrate to position the delivery nozzle at the sensed location of the hole; and (iii) operates the nozzle assembly to direct a high pressure water jet through the delivery nozzle and into the sensed hole to remove foreign matter therefrom.

In the preferred embodiment of the invention, the apparatus includes a delivery system connected to the metal substrate for delivering a reverse flow of low pressure water outwardly though the hole in a direction opposite to the flow of the jet of high pressure water from the delivery nozzle after the high pressure water jet has been discontinued, and the nozzle assembly includes a source of abrasive material that is delivered by the delivery nozzle with the high pressure water jet to form an abrasive water jet.

A probe may be mounted for movement on the frame relative to the metal substrate, the probe being capable of determining the desired distance between the delivery nozzle and the sensed hole and of creating and transmitting digitized signals representing said desired distance. The control system operates the control motors to move the probe across the surface of the substrate to the location of the sensed hole and receives the digitized signals representing the desired distance of the nozzle from the sensed hole and the angle of the hole relative to the surface of the substrate, and then operates the control motors to position the delivery nozzle at the desired location relative to the sensed hole when the water jet is directed into the sensed hole.

The apparatus may be used to strip the holes from a repaired turbine component which has a plurality of holes and which is distorted from its original condition so that the holes are not located on the surface of the turbine component in the same position as in the turbine component its original condition. In this usage, the computerized control system includes a CAD model of the turbine component in its original condition that includes the configuration of the turbine component and the location of the plurality of holes in the original turbine component, and the control system operates the control motors to first move the scanner to the location on the surface of the turbine component where the holes were located in the turbine component in its original condition as determined by the CAD model, and then moves the scanner until it senses the actual location of the sensed hole in the distorted turbine component and generates said digitized signals.

The present invention also includes a method of stripping foreign material from at least one hole in a substrate using a water jet apparatus that includes a nozzle from which a high pressure jet of water is discharged and a control system for moving the nozzle relative to the substrate, which method comprising the steps of providing a scanner that can be moved by the control system of the water jet apparatus; operating the control system to move the scanner across the surface of the substrate until the scanner senses the location of the hole in the substrate and transmits digitized signals to the control system representing the location of the sensed hole; and operating the control system to move the nozzle to a location directly opposite the sensed hole, and to direct the water jet directly into the sensed hole to remove foreign matter therefrom.

In the preferred embodiment of the present invention, this method includes the step of operating the control system to add an abrasive material to the water jet when it is directed into the senses hole, and if the substrate has a plurality of holes the operating system moves the scanner and the nozzle to each the holes in sequence. Preferably, the scanner senses an opening the surface of the substrate where the hole is located, but it may also sense a depression in such surface.

The method may also include the step of causing a reverse flow of low pressure liquid, such as water, outwardly though the holes in an opposite direction the high pressure water jet, and this reverse flow may be carried out while the high pressure water jet is being directed into a hole. If the substrate includes a cavity in fluid communication with the hole, the method may include the step of filling the cavity with water while the hole is being stripped by the high pressure water jet to thereby protect the walls of the cavity.

In the preferred embodiment, a probe is provided that can be moved by the control system of the water jet apparatus, and the control system is operated to move the probe across the surface of the substrate to the location of the sensed hole, and using the probe to transmit digitized signals representing the desired distance of the nozzle from the sensed hole and the angle of the hole relative to the surface of the substrate, and to then operate the control system to position the nozzle at the desired distance when the water jet is directed into the sensed hole.

Also, in some cases, the substrate may have a plurality of holes arranged in a straight line and have a predetermined spacing between each hole, and in this situation the method may include the step of operating the control system to move the scanner across the surface of the substrate until the scanner senses the location of the first hole at one end of the line of holes in the substrate and transmits digitized signals to the control system representing the location of the first sensed hole, and wherein the step of operating the control system to move the nozzle to a location directly opposite the sensed hole includes moving the nozzle to the sensed hole at said one end of the line of holes in the substrate, then moving the nozzle in sequence to each hole in the line of holes by moving the nozzle a distance corresponding to the spacing between the holes, and operating the control system to direct the water jet directly into each of the holes in the line to remove foreign matter therefrom in sequence.

The method may be used to strip the holes from a repaired turbine component which has a plurality of holes and which is distorted from its original condition so that the holes are not located on the surface of the turbine component in the same position as in the turbine component its original condition. In this usage, the method includes the step of creating a CAD of the turbine component in its original condition that includes the configuration of the turbine component and the location of at least one hole in the turbine component, operating the control system to move the scanner to the general location of the hole in the distorted turbine component based on the CAD model of the turbine component in its original condition, then operating the control system to move the scanner across the surface of the turbine component until the scanner senses the actual location of the hole in the distorted turbine component and to transmit the digitized signals to the control system representing the actual location of the sensed hole, and then operating the control system to move the nozzle to the location directly opposite the sensed hole and to direct the water jet directly into the sensed hole. Where the turbine component is one of a group of similar turbine components that have been subjected to similar operating conditions, such as the plurality of turbine blades that have been removed from one turbine wheel, the scanner may be moved across the surface of one of the turbine components in the group to create the CAD model of this one turbine component, and this CAD model is then put into the control system in place of the aforesaid CAD model of the original turbine component and used in stripping the holes from other turbine components in the group.

DESCRIPTION OF THE PREFERRED EMBODIMENTS

FIG. 1 is a drawing of a metal substrate, which in this case is a typical turbine component, namely a turbine blade, which can be repaired utilizing the method and apparatus of the present invention, but it will be understood that many other substrates and other turbine components can also be repaired. The turbine component illustrated in FIG. 1 is a conventional turbine blade 10 of the type that is used in a gas turbine engine, and it includes a base portion 12, and a blade portion 14, both of which are formed with a pattern of holes 16 through which a cooling gas is discharged from interior compartments within the blade portion 10 and the base portion 12, one of which is identified by the reference numeral 46 in FIG. 1, to form a thermal barrier film across the exterior surface of the turbine blade 10 as discussed above, and as is well known in the art. The pattern of holes 16 illustrated in FIG. 1 is merely one representative pattern of a large number of different hole patterns that may be formed in a turbine blade, or other turbine components.

FIG. 2 is a detail diagrammatic drawing showing a cross section through the wall of a substrate, such as the turbine blade 10, which includes one of the holes 16. In this drawing, a typical bond coat 18 has been applied to the turbine blade 10 over the base metal of the turbine blade 10, and another TBC 20 has been applied over the bond coat 18, as described above and as is well known in the art. It will be noted that when the bond coat 18 and the TBC 20 are applied to the exterior surface of the turbine blade 10, a portion of both coatings flow downwardly into the hole 16, and the hole 16 is therefore closed to a large extent by the coatings, usually leaving only a small opening 21 at the outer surface of the TBC 20. It will be understood that the drawing in FIG. 2 is diagrammatic and represents generally the fact that the holes 16 are at least partially closed by the coatings, and it will also be understood that the amount of the coatings that flow into the holes 16 can vary significantly. In some cases the holes 16 may be closed, leaving some form of a surface irregularity, such as a small depression 21' (indicated by the dotted lines in FIG. 2) in the surface of the TBC 20 at the point where some of the coating materials have flowed into the holes.

FIG. 3 is a diagrammatic view similar to FIG. 2 but showing the hole 16 after it has been stripped in accordance with the method and apparatus of the present invention, as will be described in greater detail below.

Figure 4:
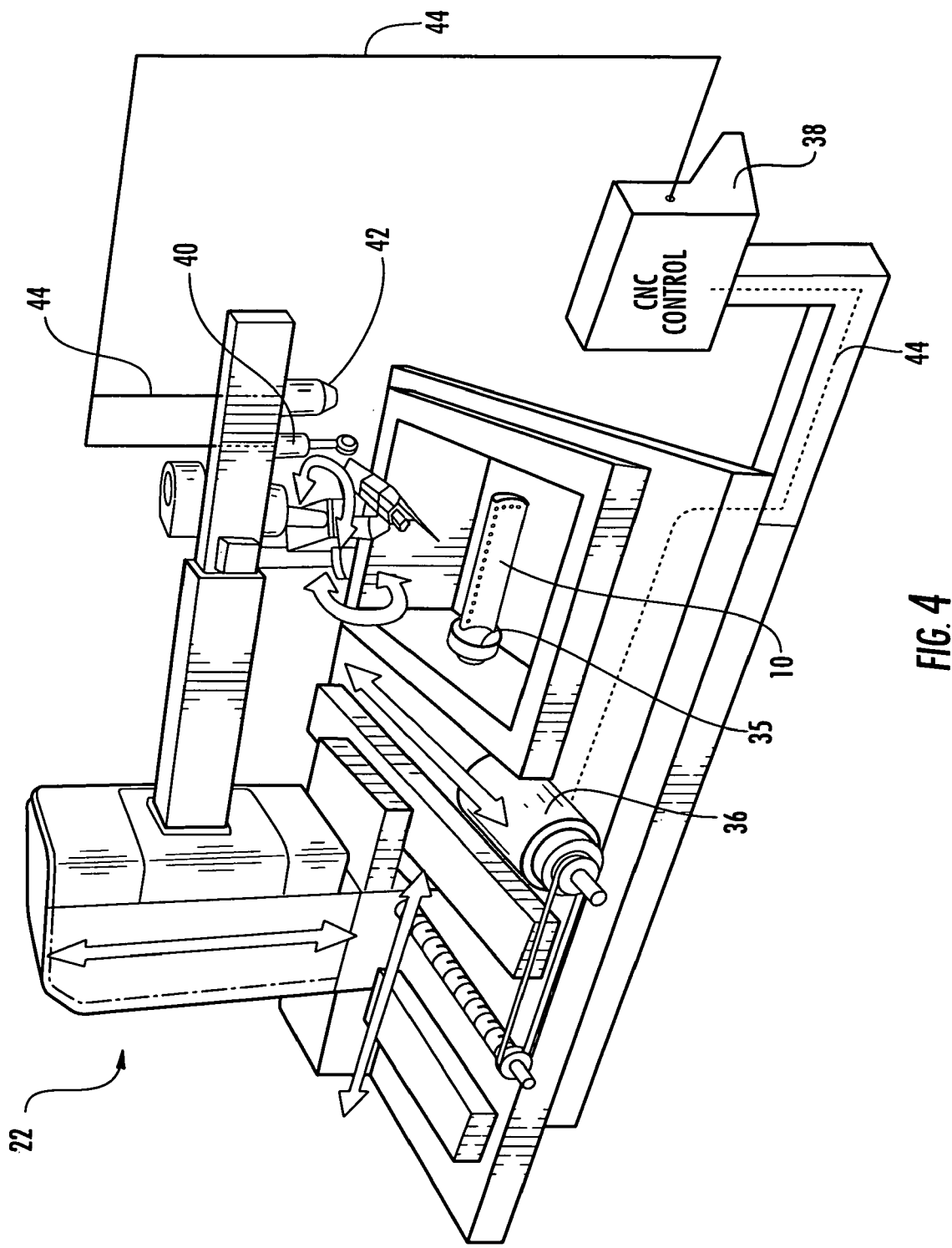
FIG. 4 is perspective view of a preferred embodiment of the apparatus of the present invention.
Figure 5:
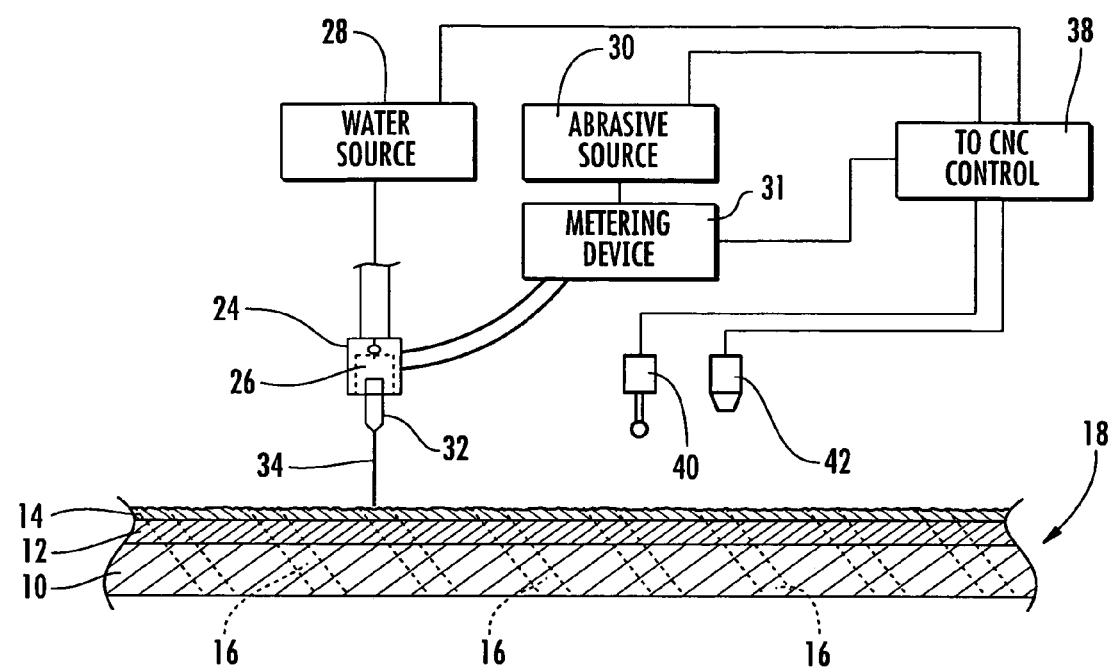
FIG. 5 is a diagrammatic view of the apparatus illustrated in FIG. 4.

In one preferred embodiment of the present invention, stripping of the holes 16 is carried out using a known abrasive jet apparatus of the type disclosed in more detail in the U.S. Pat. No. 6,905,396, which is enhanced in accordance with the present invention as described in greater detail below. The details of the abrasive water jet apparatus itself, as disclosed in the '396 patent, form no part of the present invention, and the basic components of the abrasive water jet apparatus 22 are illustrated in FIGS. 4 and 5. They include a nozzle assembly 24 having a mixing chamber 26 from which a pressurized liquid (e.g. water) is provided to the mixing chamber 26 from a source 28. The nozzle assembly 24 includes a source 30 of an abrasive material which is also delivered through a metering device 31 to the mixing chamber 26, and the combined water and abrasive is delivered from a delivery nozzle 32 as a jetted fluid stream or jet 34, usually in the range of 5,000 psi to 55,000 psi. The jet 34 is usually an abrasive water jet consisting of a combination of water and abrasive material and is generally referred to herein as an abrasive water jet, but it will be understood that the jet 34 may be consist of just water in some applications of the present invention. As best seen in FIG. 4, the workpiece is mounted in place in the apparatus using a work holding system 35, and the nozzle assembly 24 is mounted on the frame of the apparatus 22 for movement relative to the workpiece 10 about a plurality of axes (e.g. five axes, as indicated by arrows) by a plurality of motors 36, only one of which is shown diagrammatically in FIG. 4, and these motors are controlled though a conventional control system 38 that includes a conventional programmable computer to position and move the nozzle assembly 24 relative to the workpiece so that the delivery nozzle 32 is moved along a desired path across the workpiece, and to properly control the various parameters associated with the apparatus 22 (e.g. the amount of the abrasive delivered to the mixing chamber 26 and the pressure of the abrasive water jet 34 exiting the delivery nozzle 32) to vary the material removal rate of the abrasive water jet 34. While it is possible to design the water jet apparatus 22 to move the workpiece, it is preferred that the water jet apparatus 22 move the nozzle assembly 24 as described in the aforesaid '396 patent.

The conventional abrasive water jet apparatus 22 described above is modified in accordance with the present invention to include a digitizing system, which in the preferred embodiment of the present invention includes a conventional probe 40 and a conventional scanner 42, both of which are mounted for movement with the nozzle assembly 24 and both of which are used as digitizing devices in accordance with the present invention. As used herein, digitizing is intended to mean generating digital signals that create a collection of points derived from the workpiece 10 to determine a path of movement for the water jet apparatus 22 which is expressed as machine coordinates (X and Y being the coordinates on the surface of a substrate, and the Z coordinate representing the distance above the surface of the substrate. The conventional probe 40 may be a touch probe, an eddy current probe, a laser probe or any equivalent probing device, and the conventional scanner 42 is preferably a vision system scanning device similar to that disclosed in U.S. Pat. No. 4,998,005, but it may be a structured light scanner, a camera, a or any equivalent scanner that is capable of detecting holes or irregularities in the surface of a substrate. The scanner 42 is capable of recognizing the small opening 21 in the surface of the turbine blade 10 after the bond coat and the TBC have been applied to the exterior surface of the turbine blade (see FIG. 2), and are also capable of recognizing a surface irregularity such as small depression 21' in the surface of the turbine blade if the hole 16 is closed by coating material flowing into the hole 16 as described above, and it transmits electronic signals representing the location of the holes 16 through electrical lines 44 to the control system 38 of the abrasive water jet system 22 as will be described in greater below. The probe 40 moves into the sensed hole and can therefore determine the location of the hole relative to the delivery nozzle 32 when it is above the hole 16, and therefore the probe can determine a predetermined desired distance that the delivery nozzle 32 should be spaced from the hole 16 when the jet 34 is directed into the hole 16 by the delivery nozzle. Additionally, the probe may be used to sense the angle of the axis of the hole relative to the surface of the turbine blade 10, such as by placing a pin in the hole so that it extends axially outwardly from the hole so that it can be sensed by the probe. In most applications of the present invention, it is preferred to use both the scanner 42 and the probe 40 to properly determine the location of the hole 16 on the surface of the turbine component (the aforesaid X and Y coordinates by the scanner 42) and the proper or desired distance of the delivery nozzle 32 from the hole 16 (the aforesaid Z coordinate) and the angle of the hole relative to the surface of the turbine blade, but in some applications it may be possible to use only the scanner 42 without the probe 40.

In accordance with the preferred embodiment of the present invention, a metal substrate, such as a turbine blade 10 or other workpiece that has a plurality of holes 16 in the metal that need to be stripped of foreign matter, is mounted on the workpiece holding system 35, and as illustrated in FIG. 4, the turbine blade 10 is held at a position by the workpiece holding system 35 such that all of the holes 16 therein can be stripped by the water jet 34 exiting the delivery nozzle 32 by virtue of its relative movement around and across the surface of the turbine blade 10 by the control system 38. In the preferred embodiment of the present invention, the control system 38 moves the probe 40 and the scanner 42 across the surface of a substrate until they detect a hole in the substrate, and to then use the probe 40 and/or the scanner 42 to generate digitized signals representing the location and angle of the holes and the desired distance of the nozzle 32 from the holes to the control system 38 that has programmed software capable of using those digitized signals to move the delivery nozzle 32 as necessary until it is located immediately above the sensed hole, and then operate the water jet apparatus 22 to cause a water jet or an abrasive water jet 34 to be directed into the hole to strip foreign matter therefrom, the stripped hole 16 being illustrated in FIG. 3.

When the present invention is used to strip the holes of a repaired turbine component that, as noted above, has become distorted, twisted, or leans during use, the preferred first step in carrying out the present invention is to locate or generate a conventional computer-aided design (CAD) model of the turbine component that generally reflects the location of all of the holes 16 in the turbine component, and there are a number of known methods of obtaining or generating such a CAD model. It is often possible to obtain an existing CAD model from the original manufacturer of the component. If such an existing CAD model is not available, the CAD model may be generated in a conventional manner by using a conventional coordinate-measuring machine (CMM) to create a three-dimensional CAD model of the component using a blueprint or drawing of the original component. In either of these cases, the CAD model will reflect the configuration of the turbine component, and the location of the holes therein, in its original condition, and will usually also reflect the angle at which each of the holes extends inwardly relative to the surface of the turbine component.

However, if neither an existing CAD model or a drawing of the turbine component from which a CAD model can be generated is available, the CAD model may be generated by using the probe 40 and/or the scanner 42 to move along the exterior surface of one representative sample of a group of similar components that have been subjected to generally similar operating conditions, such as similar high temperatures and similar temperature variations, to get a CAD model that can be used on the other similar turbine components in the group. For example, a turbine wheel is formed with a large number of turbine blades that are mounted around the periphery of the base portion of the turbine wheel, and all of the turbine blades in that group are generally the same because they were almost identical when originally made and because they have all been subjected to the same operating conditions, but they will not be exactly the same because each turbine blade in the group will usually have different degrees of distortion in different portions of the turbine blade which will result in the holes in some of the turbine blades being moved from their original position to a slightly altered position, depending on the distortion of that particular turbine blade. Similarly, there may be groups of turbine components that come from different turbine engines but which nevertheless have similar distortion characteristics because they have been subjected to generally similar operating conditions in the different turbine engines. Therefore, when this group of turbine blades is to be repaired and the coatings have been applied to the turbine blades, one of the turbine blades in the group is selected for initially probing or scanning to determine the location of all of the holes 16 in the selected turbine blade. The probe 40, and/or the scanner 42, depending on how they are used for this step, are moved over the surface of the turbine blade by the control system 38 until the probe 40 and/or scanner 42 locate one of the holes in the surface, and the probe 40 and/or scanner 42 then generate digitized electronic signals which are transmitted to the control system 38 reflecting the location of the sensed hole 16, the angle of the hole relative to the surface of the turbine blade and the desired distance of the delivery nozzle from the sensed hole. The probe 40 and/or scanner 42 are then moved by the control system 38 until they sense the same characteristics of the next hole in the surface of the turbine blade 10, and this process is repeated until the location and angle of all of the holes have been sensed and the desired distance of the delivery nozzle from the sensed hole has been determined, and signals representing the location and angle of each of the holes and the desired distance of the delivery nozzle from the sensed hole is transmitted to the control system 38 and a CAD model of that turbine blade is thereby created. It will be understood, of course, that this CAD model generated by sensing one of the turbine blades in the group will be accurate in locating the holes in that sensed turbine blade, but it will be only approximate in locating the holes in other turbine blades in the group because of the distortion variations discussed above.

After a CAD model has been located or generated, it is input into the control system 38 which includes conventional software that is programmed to store the CAD model and to utilize the CAD model as part of the control of the operation of the abrasive jet apparatus 22. More specifically, the signals from the CAD model that are input into the computer software contain points which establish the exact locations of each of the holes 16 on the original turbine blade 10 or the exact locations of the holes on the sensed one turbine blade in the group as described above. This information is stored in the control system 38 so that it can utilize such information and control the operation of the motors 36 to move the delivery nozzle 32 to positions where the delivery nozzle 32 will be directed generally toward each of the holes 16 in a predetermined sequence.

More specifically, since this CAD model is generated or created from the original, undistorted turbine blade, or from one distorted turbine in a group of related turbine blades, the locations of the holes 16 in another distorted turbine blade is general and theoretical rather than exact, and the CAD model is used by the control system 38 to create a path of movement that moves the deliver nozzle 32 until the delivery nozzle 32 is located at the approximate or theoretical location of the first hole 16 to be cleared.

At this position, the scanner 42 (e.g. vision system) will scan the surface of the turbine blade 10 and will visually locate the exact location of the reduced opening 21 or the depression 21' in the exterior surface of the turbine blade (X-Y coordinates), and the probe 40 is used to determine the desired spacing of the delivery nozzle 32 from the opening 21 (Z coordinate) and the angle of the axis of the hole relative to the surface of the turbine blade, preferably by positioning a pin axially in the hole to extend outwardly therefrom so that its angle can be sensed by the probe. This information is transmitted to the control system 38, and the delivery nozzle 32 is moved to a position at which the first hole 16 is located directly beneath the delivery nozzle 32, and the water jet apparatus 22 is then operated in its conventional manner to deliver a water jet or an abrasive water jet 34 directly at the partially filled hole 16 so that the jet 34 strips or clears the hole 16 of any coating material or other foreign matter. In some applications of the present invention, it may not be necessary to use the probe 40, in which case the scanned 42 can be used alone in determining the location of the hole, but in most applications of the present invention it is preferred to use both the scanner 42 and the probe 40.

After one hole 16 is stripped, the control system 38 moves the delivery nozzle 32 until it is positioned at the theoretical position of the next hole 16, and the scanner 42 and the probe 40 determine the exact location of the hole 16 and spacing for the delivery nozzle, and the water jet apparatus 22 is then operated by the control system 38 to direct the jet 34 into this hole 16 in the manner described above. This process is repeated until all of the holes 16 that require stripping have been stripped.

Accordingly, the method of the present invention may include a first step of using a CAD model or equivalent model for programming the system 22 so that the delivery nozzle 32 is positioned at a general or theoretical location of each of the holes 16 in a substrate, and then using the probe 40 and the scanner 42 to determine the actual location of the holes 16, and then operating the system 22 to cause an abrasive water jet 34 to strip or clear the holes 16. It will also be understood that in some cases the material that is lodged in the holes 16 can be removed by just using the high pressure water jet delivered from the nozzle 32, and will not require the use of an abrasive water jet, in which case the system 22 is operated so that only a high pressure water jet without an abrasive is discharged from the nozzle 32. It will also be understood that because the coating materials are more easily removed by the water jet or abrasive water jet than is the base metal of the turbine component 10, even if the water jet 34 is slightly out of line with a hole 16 as it is being stripped, the jet 34 will remove virtually all of the coating materials anyway because the jet 34 will tend to remove the softer coating materials in the hole 16, even if the jet 34 is not precisely aligned with the centerline of the hole 16.

Figure 6:
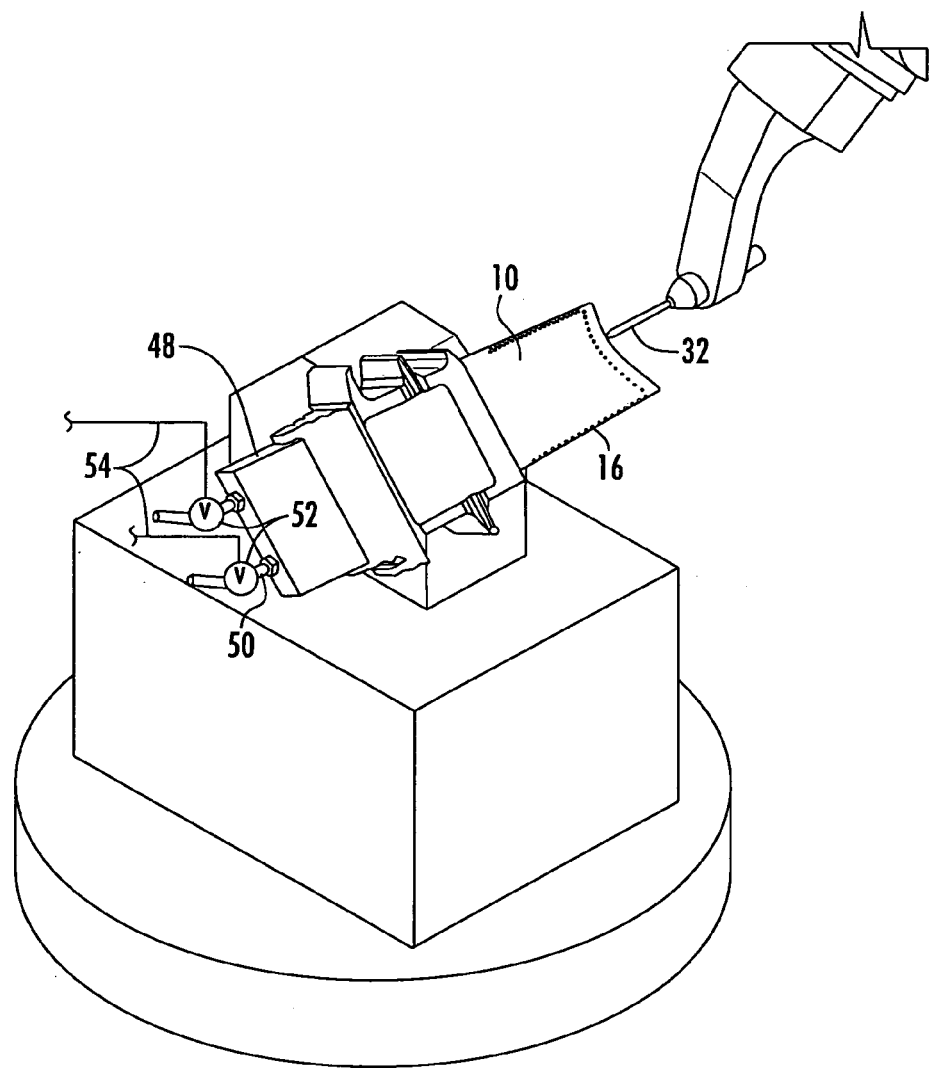
FIG. 6 is a detail view illustrating a modified mounting of a turbine component in the apparatus of the present invention which includes inlet hoses through which low pressure water can be introduced into interior cavities of the turbine component.

In accordance with another feature of the present invention, a number of advantages can be obtained by combining the hole stripping method and apparatus discussed above with a process and apparatus that can cause any suitable liquid, preferably water, to pass outwardly from the holes that have been stripped as illustrated in FIGS. 1 and 6. As is well known in the art, turbine components that are formed with holes 16 through which thermal barrier air is discharged are also formed with interior cavities 46, one of which is illustrated in FIG. 1, to provide an interior pathway for the air to reach all of the openings 16. These cavities can also provide an interior pathway through which low pressure water can be discharged outwardly through the holes 16 in accordance with this feature of the present invention. As best seen in FIG. 6, when it is desired to provide this reverse flow of water through the holes 16, the turbine component 16 is mounted within the water jet apparatus 22 in such a way that a delivery water manifold 48 can mounted in fluid communication with the interior cavities 46 of the turbine component 16 which, in turn, is in fluid communication with the holes 16 and inlet hoses 50 can provide low pressure water to the manifold 48 and the interior cavities 46 from any convenient source (not shown). The flow of water is controlled by the control system 22 using any conventional plumbing control components, such as, for example, solenoid valves 52 located in the inlet hoses 50 and having electrical lines 54 for receiving control signals from the control system 22.

As described above, some debris, small particulate matter and the like resulting from the breaking up and removal of the coating by the jet 34 may be left in the hole 16 after the hole has been stripped, and when the water is passed outwardly through the stripped holes at a relatively low pressure (e.g. conventional public water supply pressure) using the manifold 48 and the hoses 50, the aforesaid debris, particulate matter and the like that was not completely removed by the initial hole stripping process will often be removed by this reverse flow of low pressure liquid. An additional advantage of this reverse flow is that it provides a visual inspection tool for making sure that all of the holes have been properly stripped. It will be apparent that if a hole has been properly stripped, then this reverse flow of low pressure water or other liquid will create a continuous spurt of liquid that can be visually observed, confirming that the hole has been properly stripped. On the other hand, if there is no flow, or an abnormally low flow, from one or more of the stripped holes, this will indicate that more stripping may be necessary to completely clear the hole. Additionally, when the turbine component is a turbine blade or the like that includes a cavity 46 (see FIG. 1) formed by interior walls, one of which is a back wall located directly beneath one or more of the holes 16, there is a risk that the high pressure jet 34 passing inwardly through the holes 16 during stripping may have sufficient force to actually damage the back wall of the cavity formed within the turbine blade directly beneath the hole being stripped. In accordance with the present invention this problem can be ameliorated by utilizing the water supplied through the manifold 48 and hoses 50 to fill the cavity with water, and this water filled cavity 46 will form a barrier between the opening of the hole and back wall of the cavity during the hole clearing operation and thereby reduce the force of the jet 34 after it has passed through the hole 16 and protect the back wall from any penetration or damage by the jet 34. Thus, the reverse flow of liquid through the holes 16 performs two functions, namely assisting in clearing the holes 16 of debris and the like and providing a visual inspection tool to identifying holes 16 that may not have been properly stripped. Moreover, filling the cavity with water assists in reducing the likelihood that the high pressure jet 34 will damage the walls of the interior cavity within the turbine component. To obtain the first two of these advantages, the reverse flow is created after the hole has been cleared by the high pressure jet 34 and it ceases, and the third advantage is obtained by filling the cavity with water at the same time the high pressure jet is being directed into the hole.

In accordance with yet another feature of the present invention, it may be possible, in some applications to avoid having to scan each and every hole 16 in a distorted turbine component as described above, thereby increasing the speed at which these holes can be stripped. Where a plurality of holes 16 are arranged in a straight line such as the holes 16 extending upwardly along the right edge of the turbine blade 10 illustrated in FIG. 1, and where it can be determined that these holes 16 have remained in a straight line notwithstanding any distortion of the turbine blade 10, the operator of the water jet apparatus 22 can operate the apparatus so that the scanner 40 and the probe 42 are utilized to determine the exact location of only two of the holes 16' and 16" which are in the straight line and spaced from one another. Thereafter, the software in the control system 38 is programmed to move the nozzle 32 to one of the sensed holes 16' or 16" to clear that hole, and then move the nozzle 32 to the other holes in the line by moving the nozzle along the line of the holes in predetermined increments representing the known spacing between the holes 16, and causing the nozzle to direct a jet 34 at each of the holes 16 between the sensed holes 16' and 16" to strip each of the holes, all without having to sense individually all of the holes between the sensed holes 16' and 16".

In view of the aforesaid written description of the present invention, it will be readily understood by those persons skilled in the art that the present invention is susceptible of broad utility and application. Many embodiments and adaptations of the present invention other than those herein described, as well as many variations, modifications, and equivalent arrangements, will be apparent from or reasonably suggested by the present invention and the foregoing description thereof, without departing from the substance or scope of the present invention. Accordingly, while the present invention has been described herein in detail in relation to preferred embodiments, it is to be understood that this disclosure is only illustrative and exemplary of the present invention and is made merely for purposes of providing a full and enabling disclosure of the invention. The foregoing disclosure is not intended nor is to be construed to limit the present invention or otherwise to exclude any such other embodiments, adaptations, variations, modifications and equivalent arrangements, the present invention being limited only by the claims appended hereto and the equivalents thereof.

The invention claimed is:

1. A method of stripping foreign material from at least one hole in a substrate using a water jet apparatus that includes a nozzle from which a high pressure jet of water is discharged and a control system for moving the nozzle relative to the substrate, said method comprising the steps of:
    a. providing a scanner that can be moved by the control system of the water jet apparatus;
    b. operating the control system to move the scanner across the surface of the substrate until the scanner senses the location of the hole in the substrate and transmits digitized signals to the control system representing the location of the sensed hole;
    c. operating the control system to move the nozzle to a location directly opposite the sensed hole, and to direct the water jet directly into the sensed hole to remove foreign matter therefrom;
    d. providing a probe that can be moved by the control system of the water jet apparatus;
    e. operating the control system to move the probe across the surface of the substrate to the location of the sensed hole;
    f. using the probe to transmit digitized signals representing the desired distance of the nozzle from the sensed hole; and
    g. operating the control system to position the nozzle at the desired distance from the hole when the water jet is directed into the sensed hole.

2. A method of stripping foreign matter as defined in claim 1 wherein the control system adds an abrasive material to the water jet when it is directed into the sensed hole.

3. A method of stripping foreign matter as defined in claim 1 wherein the substrate includes a plurality of holes, and wherein the control system moves the scanner and the nozzle to each of the holes in sequence.

4. A method of stripping foreign matter as defined in claim 1 wherein the scanner senses an opening in the surface of the substrate at the location of the hole.

5. A method of stripping foreign matter as defined in claim 1 wherein the scanner senses an irregularity in the surface of the substrate at the location of the hole.

6. A method of stripping foreign matter as defined in claim 1 wherein the method includes the step of causing a reverse flow of low pressure water outwardly through the hole in a direction opposite to the high pressure water jet.

7. A method of stripping foreign matter as defined in claim 6 wherein the reverse flow of low pressure water flows outwardly through the hole after the high pressure water jet has stopped directing high pressure water into the hole.

8. A method of stripping foreign matter as defined in claim 1 wherein substrate has a cavity in communication with the hole, and wherein the method includes the step of filling the cavity with water while the high pressure water jet is being directed into the hole to thereby protect the walls of the cavity.

9. A method of stripping foreign matter as defined in claim 1 wherein the substrate has a plurality of at least three holes located in a straight line and at predetermined spacings from one another, and wherein the step of operating the control system to move the scanner includes moving the scanner across the surface of the substrate until the scanner senses the location of the first hole at one end of the line of holes in the substrate and transmits digitized signals to the control system representing the location of the first sensed hole, and wherein the step of operating the control system to move the nozzle to a location directly opposite the sensed hole includes moving the nozzle to the sensed hole at said one end of the line of holes in the substrate, then moving the nozzle in sequence to each hole in the line of holes by moving the nozzle a predetermined distance corresponding to the spacing between the holes, and operating the control system to direct the water jet directly into each of the holes in the line to remove foreign matter therefrom in sequence.

10. A method of stripping foreign material from at least one hole in a turbine component that has been distorted from its original condition through usage using a water jet apparatus that includes a nozzle from which a high pressure jet of water is discharged and a control system for moving the nozzle relative to the substrate, said method comprising the steps of:
    a. inputting into the control system a CAD model of the turbine component in its original condition that includes the configuration of the turbine component and the location of said at least one hole therein;
    b. providing a scanner that can be moved by the control system of the water jet apparatus;
    c. operating the control system to move the scanner to the general location of the hole in the distorted turbine component based on the CAD model of the turbine component in its original condition;
    d. operating the control system to move the scanner across the surface of the turbine component until the scanner senses the actual location of the hole in the distorted turbine component and to transmit digitized signals to the control system representing the actual location of the sensed hole; and e. operating the control system to move the nozzle to a location directly opposite the sensed hole, and to direct the water jet directly into the sensed hole to remove foreign matter therefrom;

f. providing a probe that can be moved by the control system of the water jet apparatus;

g. operating the control system to move the probe across the surface of the turbine component to the location of the sensed hole;

h. using the probe to transmit digitized signals representing the desired distance of the nozzle from the sensed hole;

i. and operating the control system to position the nozzle at the desired distance when the water jet is directed into the sensed hole.

11. A method of stripping foreign matter as defined in claim 10 wherein the control system adds an abrasive material to the water jet when it is directed into the sensed hole.

12. A method of stripping foreign matter as defined in claim 10 wherein the turbine component includes a plurality of holes, and wherein the control system moves the scanner and the nozzle to each of the holes in sequence.

13. A method of stripping foreign matter as defined in claim 10 wherein the scanner senses an opening in the surface of the turbine component at the location of the hole.

14. A method of stripping foreign matter as defined in claim 10 wherein the scanner senses an irregularity in the surface of the turbine component at the location of the hole.

15. A method of stripping foreign matter as defined in claim 10 wherein the turbine component is formed with a cavity in fluid communication with the sensed hole, and wherein the method includes the step of causing a reverse flow of low pressure water through the cavity of the turbine component and outwardly through the hole in a direction opposite to the high pressure water jet.

16. A method of stripping foreign matter as defined in claim 15 wherein the reverse flow of low pressure water flows outwardly through the hole after the high pressure water jet has stopped directing high pressure water into the hole.

17. A method of stripping foreign matter as defined in claim 10 wherein the turbine component is formed with a cavity in fluid communication with the sensed hole, and wherein the method includes the step of filling the cavity with water while the high pressure water jet is being directed into the hole to thereby protect the walls of the cavity.

18. A method of stripping foreign matter as defined in claim 10 wherein the turbine component has a plurality of at least three holes located in a straight line and at predetermined spacings from one another, and wherein the step of operating the control system to move the scanner includes moving the scanner across the surface of the turbine component until the scanner senses the location of the first hole at one end of the line of holes in the turbine component and transmits digitized signals to the control system representing the location of the first sensed hole, then moving the scanner across the surface of the turbine component until the scanner senses the location of the hole at other end of the line of holes in the turbine component and transmits digitized signals to the control system representing the location of the second sensed hole, and wherein the step of operating the control system to move the nozzle to a location directly opposite the sensed hole includes moving the nozzle to the sensed hole at one end of the line of holes in the turbine component, then moving the nozzle in sequence to each hole in the line of holes by moving the nozzle a predetermined distance corresponding to the spacing between the holes, and operating the control system to direct the water jet directly into each of the holes in the line to remove foreign matter therefrom.

19. Apparatus for stripping foreign matter from at least one hole in the surface of a metal substrate which includes:

a. a frame;

b. a mounting means for mounting the metal substrate in the frame;

c. a nozzle assembly mounted in the frame for movement relative to the metal substrate the nozzle assembly including a delivery nozzle for directing a jet of high pressure water therefrom;

d. a scanner mounted on the frame for movement relative to the metal substrate, the scanner being capable of sensing a hole in the surface of the metal substrate and creating and transmitting digitized signals representing the location of the sensed hole on the surface of the metal substrate;

e. motion control motors for moving the nozzle assembly and the scanner relative to the metal substrate;

f. a computerize control system which:

(i) controls the motion control motors to move the scanner across the surface of the metal substrate until the scanner senses the location of a hole in the surface of the metal substrate and generates the digitized signals representing the location of the hole;

(ii) receiving the digitized signals from the scanner and using such signals to control the motion control motors to move the nozzle assembly relative to the metal substrate to position the delivery nozzle at the sensed location of the hole; and (iii) operating the nozzle assembly to direct a high pressure water jet through the delivery nozzle and into the sensed hole to remove foreign matter therefrom;

g. a probe mounted for movement on the frame relative to the metal substrate, the probe being capable of determining the desired distance between the delivery nozzle and the sensed hole and of creating and transmitting digitized signals representing said desired distance, and h. the control system operating the control motors to move the probe across the surface of the turbine component to the location of the sensed hole and receiving the digitized signals representing the desired distance of the nozzle from the sensed hole, and then operating the control motors to position the delivery nozzle at the desired distance relative to the sensed hole when the water jet is directed into the sensed hole.

20. Apparatus for stripping foreign matter as defined in claim 19 wherein the apparatus includes a delivery system connected to the metal substrate for delivering a reverse flow of low pressure water outwardly though the hole in a direction opposite to the flow of the jet of high pressure water from the delivery nozzle.

21. Apparatus for stripping foreign matter as defined in claim 19 wherein the nozzle assembly includes a source of abrasive material that is delivered by the delivery nozzle with the high pressure water jet to form an abrasive water jet.

22. Apparatus for stripping foreign matter from a plurality of holes in the surface of a turbine component which includes:

a. a frame;

b. a mounting means for mounting a turbine component in the frame;

c. a nozzle assembly mounted in the frame for movement relative to the turbine component the nozzle assembly including a delivery nozzle for directing a jet of high pressure water therefrom;

d. a scanner mounted for movement on the frame relative to the turbine component, the scanner being capable of sensing a hole in the surface of the turbine component and creating and transmitting digitized signals representing the location of the sensed hole on the surface of the turbine component;
e. motion control motors for moving the nozzle assembly and the scanner relative to the turbine component;
f. a computerize control system which:
   (i) controls the motion control motors to move the scanner across the surface of the turbine component until the scanner senses the location of a hole in the surface of the turbine component and generates the digitized signals representing the location of the hole;
   (ii) receiving the digitized signals from the scanner and using such signals to control the motion control motors to move the nozzle assembly relative to the turbine component to position the delivery nozzle at the sensed location of the hole;
   (iii) operating the nozzle assembly to direct a water jet through the delivery nozzle and into the sensed hole to remove foreign matter therefrom; and
   (iv) repeating said control of the motion control motors and the nozzle assembly until all of the plurality of holes in the turbine component have been stripped;
g. a probe mounted for movement on the frame relative to the metal substrate, the probe being capable of determining the desired distance between the delivery nozzle and the sensed hole and of creating and delivering digitized signals representing said desired distance; and
h. the computerized control system operating the control motors to move the probe across the surface of the turbine component to the location of the sensed hole and receiving the digitized signals representing the desired distance of the nozzle from the sensed hole, and then operating the control motors to position the delivery nozzle at the desired distance relative to the sensed hole when the water jet is directed into the sensed hole.

23. Apparatus for stripping foreign matter from a plurality of holes in the surface of a turbine component as defined in claim 22 wherein the turbine component is distorted from its original configuration though usage, wherein the computerized control system includes a CAD model of the turbine component in its original condition that includes the configuration of the turbine component and the location of the plurality of hoes in the original turbine component, and wherein the computerized control system operates the control motors to first move the scanner to the location on the surface of the turbine component where the holes were located in the turbine component in its original condition as determined by the CAD model and then moves the scanner until it senses the actual location of the sensed hole in the distorted turbine component and generates said digitized signals.

24. Apparatus for stripping foreign matter from a plurality of holes in the surface of a turbine component as defined in claim 22 wherein the apparatus includes a liquid delivery system connected to the turbine component for delivering a reverse flow of low pressure liquid outwardly though the hole in a direction opposite to the flow of the jet of high pressure water from the delivery nozzle.

25. Apparatus for stripping foreign matter from a plurality of holes in the surface of a turbine component as defined in claim 22 wherein the nozzle assembly includes a source of abrasive material that is delivered by the delivery nozzle with the high pressure water jet to form an abrasive water jet.

* * * * *